Sept. 12, 1939.　　　　F. E. PAVELKA　　　　2,172,518
VARIABLE MOTION TRANSMITTER
Filed Dec. 2, 1936　　　2 Sheets-Sheet 1
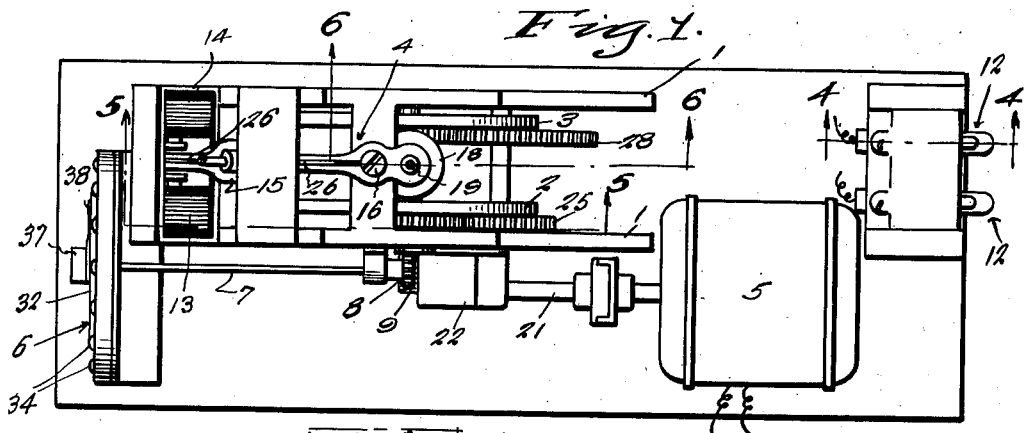
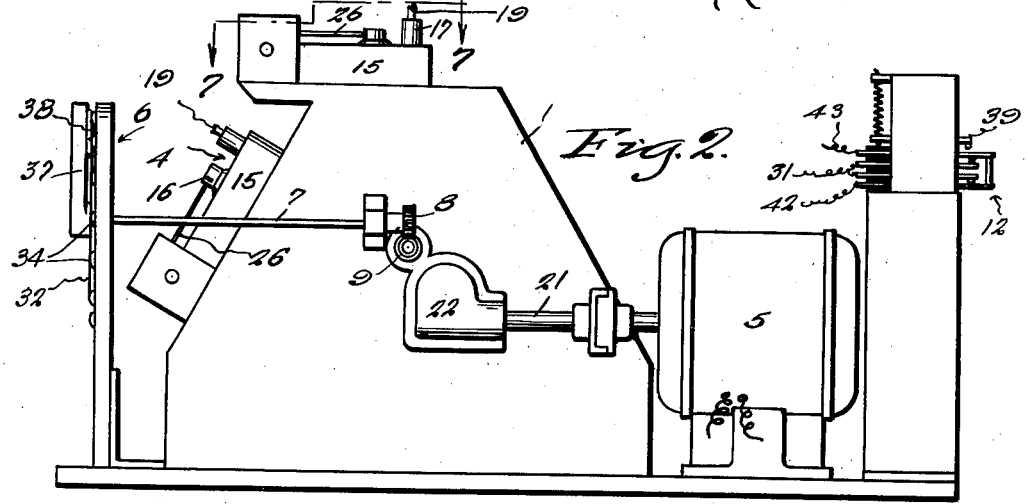
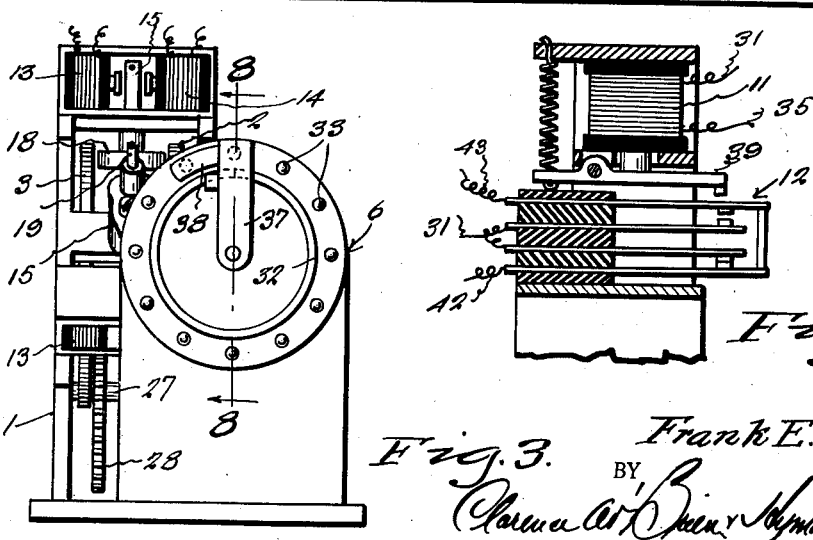
INVENTOR.
Frank E. Pavelka
BY
ATTORNEYS

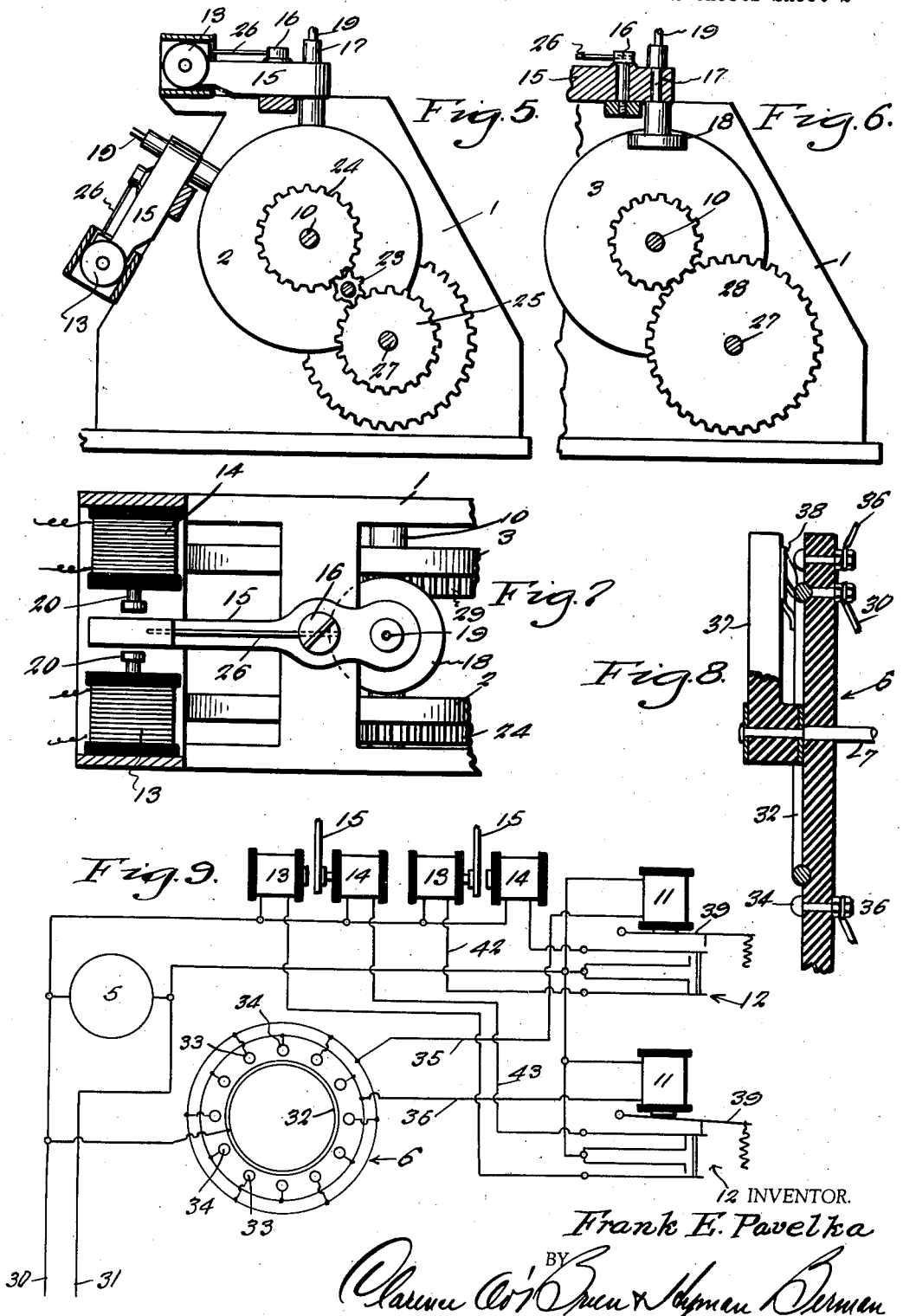

Patented Sept. 12, 1939

2,172,518

UNITED STATES PATENT OFFICE 2,172,518

VARIABLE MOTION TRANSMITTER

Frank E. Pavelka, San Antonio, Tex.

Application December 2, 1936, Serial No. 113,885

4 Claims. (Cl. 74—201)

This invention relates to improvements in variable motion transmitting mechanism and more particularly to a motion transmitting mechanism which may be used as a multiple unit in which the component members may be synchronized or operated independently for changing the speed ratio between the power inlet and the output.

An object of this invention is to provide a mechanism which may have either a single or a plurality of power transmitting members, these members being actuated from fast to slow speed, or the reverse, either manually or mechanically.

Another object of the invention is to enable the power transmitting members to be operated in a synchronized or semi-synchronized relation to each other, or to permit the operation of one or more members to be done manually and independently of the remaining members.

In order to explain the utility of such a mechanism the following examples may be given:—

In amusement devices of the coin operated type there is frequently a need for a motion which varies in speed, and where there are several units operated from the same power source it is desirable to alternate the speeds of the various units at predetermined intervals. That is, one unit may run at high speed continuously while another unit may run constantly at low speed. Still another unit may alternate from high speed to low speed and back again.

In machine tool operation where a single unit or a plurality of units are in operation at the same time there is frequently a need of increasing or decreasing the speed of one or more units while the remaining parts run at constant speed.

It is often desirable where conveyors of various types are run in multiple to have a means of changing the speed of one or more of the conveyors with relation to the others at given intervals.

This disclosure comprises a preferred construction of the speed changing mechanism, but is not intended as limiting the mechanism to that shown so long as such mechanism shall remain within the spirit of the invention.

The above named objects are accomplished as described in the following specification and illustrated in the accompanying drawings in which like reference characters refer to like parts throughout the various views.

In the drawings:

Figure 1 is a plan of the speed changing mechanism.

Figure 2 is a side elevation.

Figure 3 is an end elevation.

Figure 4 is an enlarged fragmentary section taken on the line 4—4 of Figure 1.

Figure 5 is a sectional view taken on the line 5—5 of Figure 1.

Figure 6 is a fragmentary section taken on the line 6—6 of Figure 1.

Figure 7 is an enlarged fragmentary plan of one of the speed changing members, taken on the line 7—7 of Figure 2.

Figure 8 is an enlarged vertical section taken on the line 8—8 of Figure 3.

Figure 9 is a diagrammatic illustration of the wiring.

Attention is here invited to Figures 1 and 2 which show the power transmitting and speed changing mechanism to consist of a frame 1 carrying the discs 2 and 3 and the power transmitting and speed changing units generally denoted by the numeral 4. The motor 5 is the source of power in this instance. The mixer or timing element, generally denoted by the numeral 6, is actuated in this case by the shaft 7 driven by the worm gear 8 which engages a worm 9 on the end of the disc shaft 10. The assembly 6 actuates the magnets 11 (see Figure 4) which control the switches 12 supplying current to the solenoids 13 and 14.

In describing the actual speed changing action an inspection of Figures 5, 6 and 7 is invited. It is seen that the arm 15 of the speed changing unit is pivoted on the stud 16 and carries at its outer end a spindle 17 fitted to the friction roller 18 at one end and to a flexible shaft 19 at its other end. The opposite end of the arm 15 is located between the solenoids 13 and 14. When either one of the solenoids is energized, its corresponding plunger 20 acts against the end portion of the arm 15 and thereby causes the engagement of the roller 18 with one or the other of the discs 2 or 3. An examination of Figures 5 and 6 will show that the discs 2 and 3 rotate at different speeds and in opposite directions. This is as it should be, since this difference in speed is the means of securing the speed change for the spindle 17 and the opposed direction of rotation is necessary in order that the direction of rotation of the spindle 17 may remain unchanged as the roller 18 is changed in contact from one to the other of the discs 2 and 3. In describing the transmission of power through the speed changing mechanism it will be noticed that the motion of the shaft 21, which is connected to the power source, transmits motion through the speed reducer 22 to the pinion 23. The pinion 23 (Figure 5) meshes with the gears 24 and 25 which are rigidly mounted on the shafts 10 and 27 respectively. These two shafts are thus driven at the same speeds and in the same direction. Assuming that the pinion 23 rotates in a clockwise direction, the direction of rotation of the shafts 10 and 27 will be counter-clockwise. The disc 2 is rigidly secured to the shaft 10 while the disc 3 is rotatably mounted on this same shaft. It follows that the disc 2 will therefore rotate in a counter-clockwise direction and have the same speed as the shafts 10 and 27. The disc 3 being rotatably mounted on the shaft 10 is driven through the gears 28 and 29 and will therefore have a clockwise direction of rotation. As the gear 28, which is keyed to the shaft 27 is larger than the gear 29, it is obvious that the speed of the disc 3 will be greater than that of disc 2. From the foregoing description it is clear that as the roller 18 engages first one disc and then the other that its speed will be changed, while its direction of rotation remains the same. A spring 26 extends from the stud 16 into a hole near the solenoid end of the arm 15, the purpose of this spring being to hold the roller 18 in a neutral position when the solenoids 13 and 14 are inactive. Thus, it is seen that when neither solenoid is energized the roller 18 will contact neither of the discs 2 or 3, therefore no motion will be transmitted through that particular roller.

An examination of Figures 3, 4, 7, 8, and 9 will show how this is accomplished as follows:

Of the lines 30 and 31 leading into the machine, the line 30 may be considered as positive and leads to the motor 5, the solenoids 13 and 14, and to the central contact ring 32 of the timing element 6. The negative line, or 31, connects to the motor 5, the magnets 11, and the switches 12. The timing element 6 consists of a contact ring 32 connected to the line 30 and surrounded by a series of alternating contact points 33 and 34, the points 33 being connected to the line 35 leading to one of the magnets 11, and the points 34 being connected to the line 36 leading to the other magnet 11. An arm 37 carrying the switch blade 38 serves to establish contact between the ring 32 and the points 33 and 34 as it rotates, thereby alternately closing and breaking the circuit to the magnets 11.

It may be well at this point to describe the operation of the switches 12. Referring to Figure 4 it will be noticed that the magnet 11, which is mounted above the switch, acts on a switch actuating arm 39. The switch proper consists of four leaves as shown, the two center leaves being connected to the line 31. The upper leaf is connected to the line 40 leading to one of the solenoids 14 and the lower leaf is connected to the line 41 leading to one of the solenoids 13.

Assuming that the mechanism is in operation and that the arm 37 of the timing element 6 occupies the position indicated in Figure 3 at this instant, it is clear that contact is established between the ring 32 and one of the points 33. This closes the circuit through the line 35 to the upper magnet 11 (Figure 9) and raises the arm 39 thereby allowing the lower set of points of the switch 12 to contact and close the circuit through line 42 to one of the solenoids 13. The action of the plunger 20 against the arm 15 (Figure 7) will then cause the roller 18 to come in contact with the disc 3, and this will be the high speed position for that roller.

As the circuit is broken between the ring 32 and the line 36 at this stage, the lower magnet 11 (Figure 9) is dead and the arm 39 is in its lower position, thereby establishing contact between the upper contact points of the switch 12. This will close the circuit, through the line 43 to one of the solenoids 14, causing its plunger to move the roller 18 (through the medium of the arm 15) into contact with the disc 2. This will be the low speed position of that roller.

As the arm 37 rotates, the circuit between the ring 32 and the line 35 will be broken and contact will be established between the ring and line 36. When this happens, the reverse of the above named actions will occur.

It is obvious that the number, spacing, and shape of the points 33 and 34 may be varied to suit individual requirements. Also, any desired number of rollers 18 may be employed. It is also clear that instead of one pair of the discs 2 and 3, that two or more pairs may be used. Furthermore, where two or more pairs of the discs are used, it is possible to run the discs which are rotatably mounted on the shaft 10 at different speeds by changing the ratio between the gears 28 and 29 on the different discs corresponding to disc 3.

From the foregoing description it is apparent that the number of spindles and the variations in speed and timing that may be secured with this mechanism are practically unlimited. If, instead of using an electrically controlled system as outlined, it is desired to take care of the speed changes mechanically or manually, this could be accomplished by substituting such other means as desired in place of the timing element, magnets, and solenoids shown here. This would comprise substantially the same construction of the frame, discs, and roller mechanism as shown.

The invention as herein set forth comprises a simple, practical, and easily constructed assembly with a wide range of applications.

What is claimed is:

1. A variable motion transmitter comprising a pair of rotary members, means for driving the rotary members at different speeds in relation to each other, said rotary members being located in juxtaposition, a swingable member, a power take-off shaft carried by the swingable member, a member carried by the shaft and adapted to be engaged with one or the other of the rotary members to drive the take-off shaft, said swingable member being constructed at one end to define an armature and a pair of alternately energizable magnets, one at each side of the armature, said armature being within the magnetic flux of magnets when energized.

2. A variable motion transmitter comprising a pair of rotary members, means for driving the rotary members at different speeds in relation to each other, said rotary members being located in juxtaposition, a swingable member, a power take-off shaft carried by the swingable member, a member carried by the shaft and adapted to be engaged with one or the other of the rotary members to drive the take-off shaft, said swingable member being constructed at one end to define an armature and a pair of alternately energizable magnets, and spring means for holding the member on the shaft spaced from the rotary members when the magnets are deenergized.

3. A variable motion transmitter comprising a pair of rotary members, means for driving the rotary members at different speeds in relation to each other, said rotary members being located in juxtaposition, a swingable member, a power take-off shaft carried by the swingable member, a member carried by the shaft and adapted to be engaged with one or the other of the rotary members to drive the take-off shaft, said means for driving the rotary members including an electric motor and means driven by the motor in conjunction with a source of current for swinging the swingable member to cause the member on the shaft to alternately engage the rotary members.

4. A variable motion transmitter comprising a pair of rotary members, means for driving the rotary members at different speeds in relation to each other, said rotary members being located in juxtaposition, a swingable member, a power take-off shaft carried by the swingable member, a member carried by the shaft and adapted to be engaged with one or the other of the rotary members to drive the take-off shaft, said swingable member being constructed at one end to define an armature and a pair of alternately energizable magnets, one at each side of the armature, said armature being within the magnetic flux of magnets when energized, and a motor included in the means for driving the rotary members, a source of current to the electro-magnets and a commutator driven by the motor and interposed between the source of current and the electro-magnets for alternately energizing the same.

FRANK E. PAVELKA.